(12) United States Patent
Wang et al.

(10) Patent No.: US 9,488,418 B2
(45) Date of Patent: Nov. 8, 2016

(54) HEAT PLATE STRUCTURE

(71) Applicant: CHAUN-CHOUNG TECHNOLOGY CORP., New Taipei (TW)

(72) Inventors: Shih-Ming Wang, New Taipei (TW); Pang-Hung Liao, New Taipei (TW); Cheng-Tu Wang, New Taipei (TW)

(73) Assignee: CHAUN-CHOUNG TECHNOLOGY CORP., New Taipei (TW)

( * ) Notice: Subject to any disclaimer, the term of this patent is extended or adjusted under 35 U.S.C. 154(b) by 224 days.

(21) Appl. No.: 14/326,398

(22) Filed: Jul. 8, 2014

(65) Prior Publication Data

US 2016/0010926 A1    Jan. 14, 2016

(51) Int. Cl.
*F28D 15/02*    (2006.01)
*B23P 15/26*    (2006.01)

(52) U.S. Cl.
CPC ........... *F28D 15/0233* (2013.01); *B23P 15/26* (2013.01); *F28D 15/0275* (2013.01); *F28D 15/0283* (2013.01)

(58) Field of Classification Search
CPC ............. Y10T 29/49353; F28D 15/04; F28D 2240/00; F28D 2275/02; F28D 15/0283; F28D 15/0233; F28D 15/0275; H05K 23/427; B23P 15/26

USPC .......................................................... 165/166
See application file for complete search history.

(56) References Cited

U.S. PATENT DOCUMENTS

| | | | | |
|---|---|---|---|---|
| 3,680,189 A | * | 8/1972 | Noren | B21D 53/02 165/104.26 |
| 4,046,190 A | * | 9/1977 | Marcus | F28D 15/0233 165/104.26 |
| 4,461,343 A | * | 7/1984 | Token | F28D 15/0233 165/104.26 |
| 6,293,332 B2 | * | 9/2001 | Li | 165/104.26 |
| 6,889,756 B1 | * | 5/2005 | Hou | F28D 15/0233 165/104.21 |
| 8,256,501 B2 | * | 9/2012 | Nagai | F28D 15/0233 165/104.21 |

* cited by examiner

*Primary Examiner* — Tho V Duong
(74) *Attorney, Agent, or Firm* — Chun-Ming Shih; HDLS IPR Services

(57) ABSTRACT

A heat plate sealing method and structure thereof includes a) providing a bottom plate and a cover plate engaging with each other; b) providing a welding frame; c) disposing the welding frame between the bottom plate and the cover plate; d) placing solder on the welding frame; e) sandwiching the welding frame having the solder thereon between the bottom plate and the cover plate; and f) conducting thermal melting on the solder to seal the bottom plate and the cover plate. Therefore, a sealing structure is strengthened and the airtightness during a sealing process is enhanced.

6 Claims, 5 Drawing Sheets

HEAT PLATE STRUCTURE

BACKGROUND

1. Technical Field

The present invention relates to a heat plate sealing structure and, in particular, to a heat plate sealing method and a structure thereof.

2. Related Art

A heat plate and a heat pipe both work on the same principal. Basically, a liquid is disposed in a sealed plate-form chamber to efficiently transfer heat by a phase transition, of the liquid, between a vapor phase and a liquid phase.

In a traditional heat plate manufacturing process, a lower case and an upper case of a sealed chamber are sealed together by conducting a welding process. After circumferential edges of the lower case and the upper case engage with each other, solder is applied so as to seal the circumferential edges. Finally, a liquid is disposed inside the heat plate and a degasifying step is conducted.

Further, the liquid inside the heat plate transfers heat by flow circulation and the phase transition. Since the inside of the heat plate is often under influences of hot expansion or cold shrinkage, the airtightness of the heat plate is significant. Therefore, during a welding step of sealing the heat plate, a sealed portion of the heat plate breaks when the solder is not properly disposed or the welding step is not properly performed, which resulting in serious consequences like a loss of the inside vacuum and leakage of the liquid. Additionally, since the case of the heat plate is extremely light and thin, the structure does not have sufficient strength, and the circumferential edge, where the solder is applied to, tends to be deformed by enteral force, and thereby the airtightness is lowered and heat conductivity of the heat plate is compromised.

In view of the foregoing, the inventor made the present invention to achieve the above-mentioned objects and improve the above-mentioned issues.

BRIEF SUMMARY

It is an object of the present invention to provide a heat plate sealing method and a structure thereof to strengthen a sealed structure and enhances airtightness of the sealed structure.

Accordingly, the present invention provides a heat plate sealing method. The heat plate sealing method of the present invention comprises a) providing a bottom plate and a cover plate engaging with each other; b) providing a welding frame having a plurality of welding beads, the welding beads surrounding a circumferential edge of the welding frame and including an inner track welding bead and an outer track welding bead disposed outside the inner track welding bead; c) disposing the welding frame between the bottom plate and the cover plate; d) placing solder on the welding beads; e) sandwiching the welding frame having the solder thereon between the bottom plate and the cover plate; and f) conducting thermal melting on the solder to seal the bottom plate and the cover plate.

Accordingly, a heat plate of the present invention includes a bottom plate, a cover plate, a welding frame, solder, and a capillary tissue. The cover plate is disposed to correspondingly engage with the bottom plate. The welding frame is disposed between the bottom plate and the cover plate. The welding frame has a plurality of welding beads, and the welding beads surround a circumferential edge of the welding frame and include an inner track welding bead and an outer track welding bead disposed outside the inner track welding bead. A plurality of pieces of solder are placed on the welding beads correspondingly. The capillary tissue is disposed between the bottom plate and the cover plate. The bottom plate and the cover plate are sealed together by conducting thermal melting on the solder.

Compared to conventional techniques, the heat plate of the present invention provides the welding frame between the circumferential edges of the bottom plate and the cover plate. The welding frame comprises the plurality of welding beads, and the welding beads surround the circumferential edge of the welding frame. The welding beads include the inner track welding bead and the outer track welding bead. The solder is disposed on the welding beads correspondingly. Then, thermal melting is conducted on the solder to seal together the circumferential edges of the bottom plate and the cover plate. Accordingly, the strength of the sealed structure is enhanced by means of disposing the welding frame. Furthermore, the inner track welding bead is disposed staggeredly with respect to the outer track welding bead, so the airtightness of the sealed structure after welding is assured by such layered welding.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
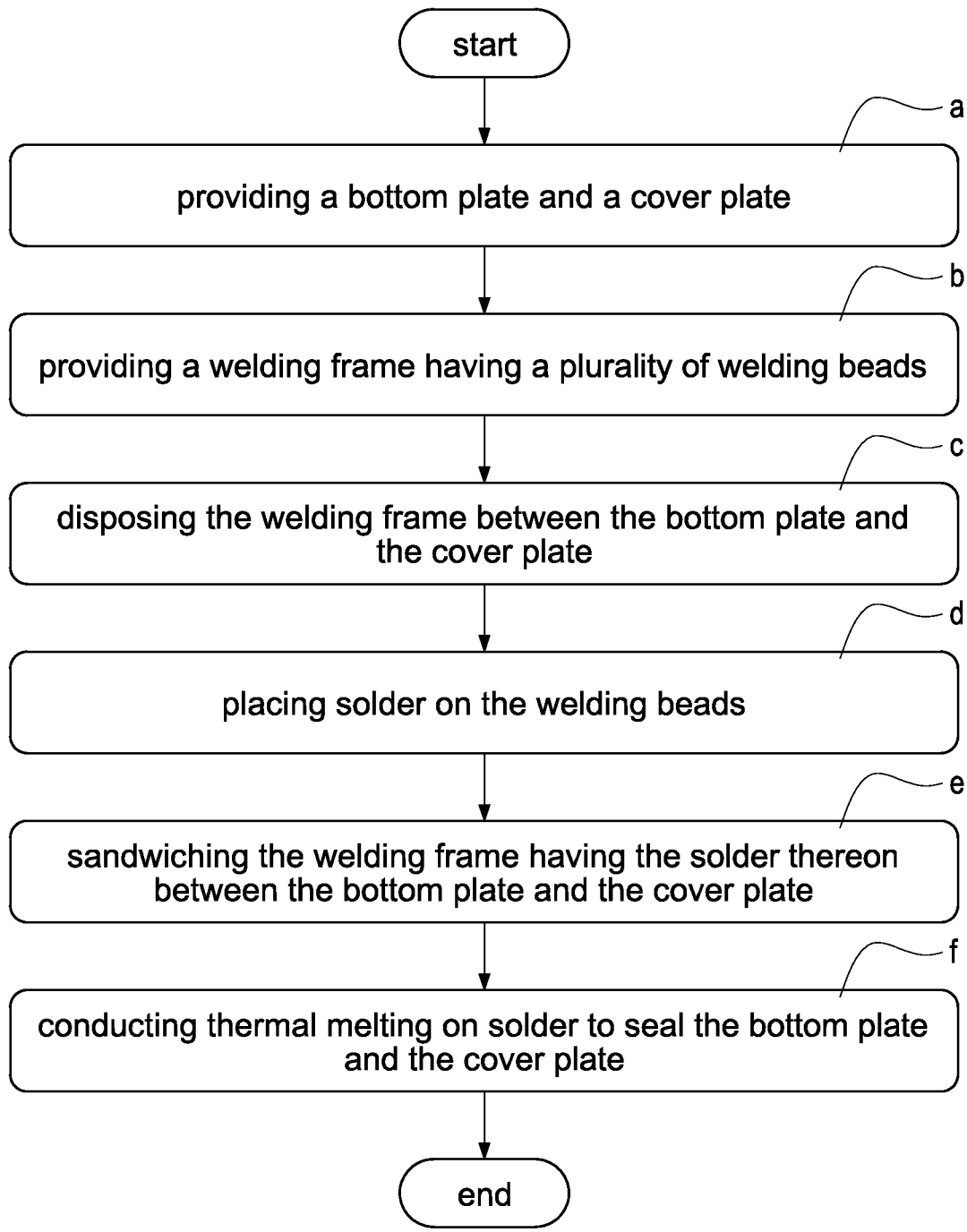
FIG. 1 is a flow chart of a heat plate sealing method according to the present invention.
Figure 2:
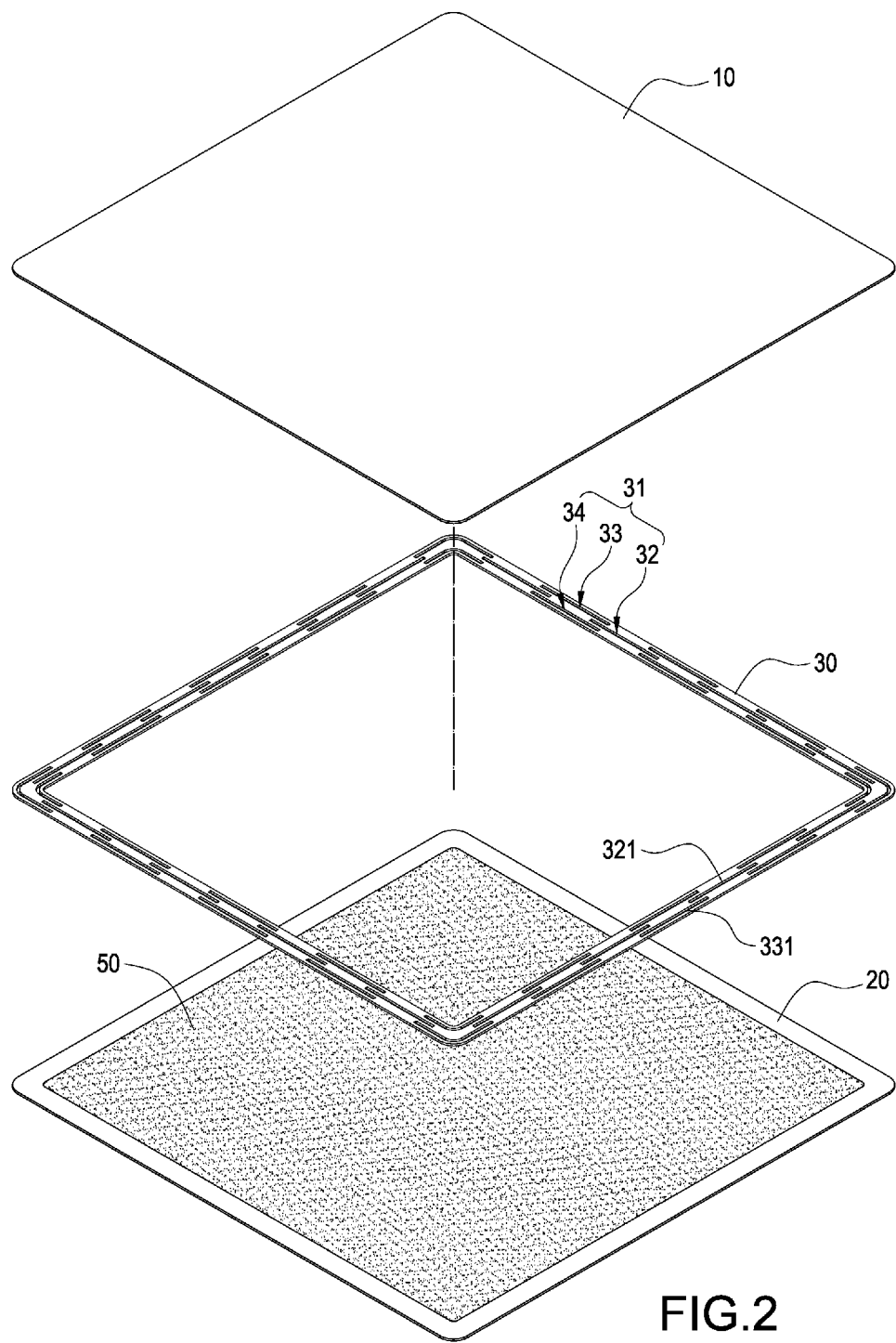
FIG. 2 is an exploded view of a heat plate according to the present invention.
Figure 3:
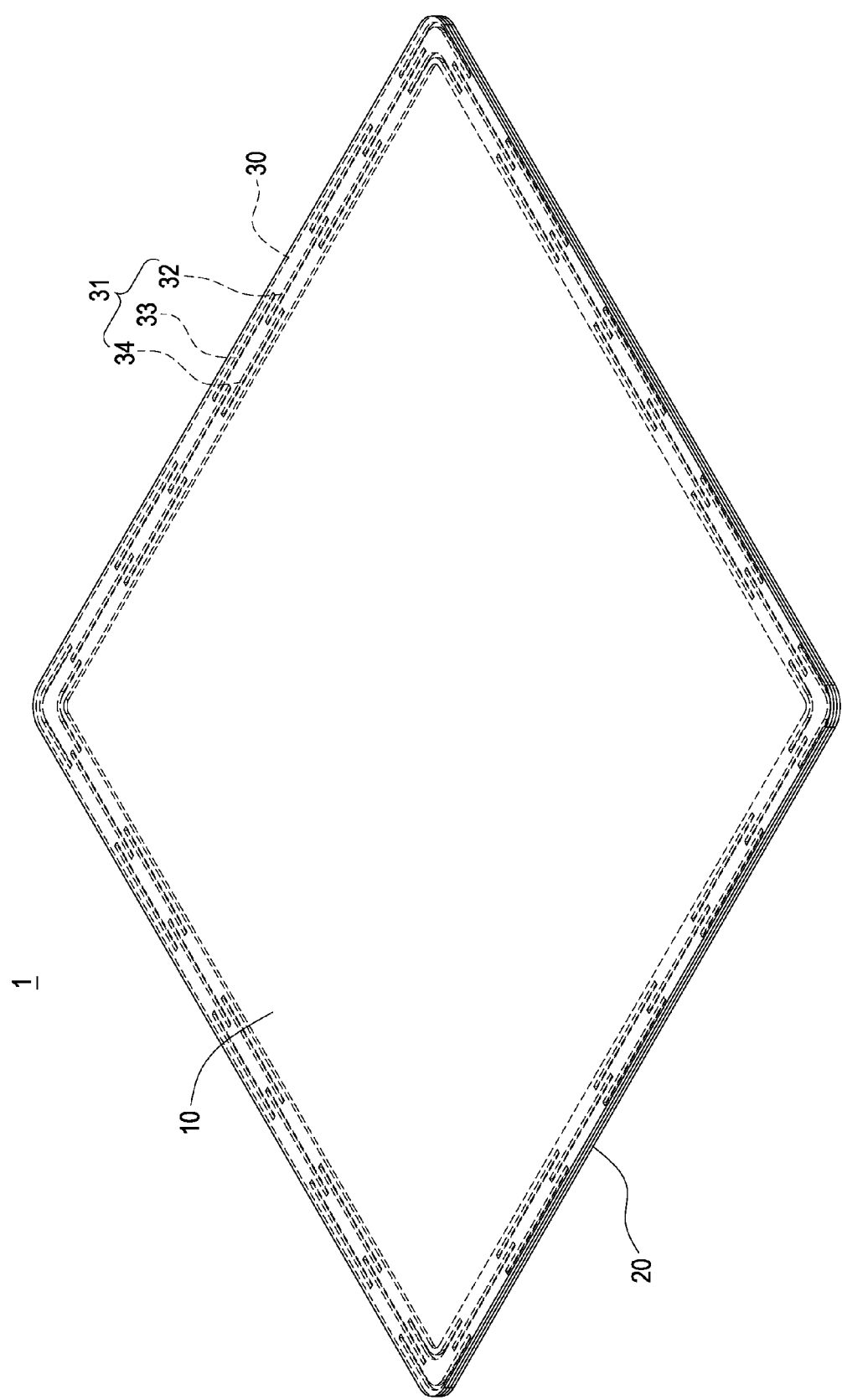
FIG. 3 is an appearance view of the heat plate according to the present invention.
Figure 4:
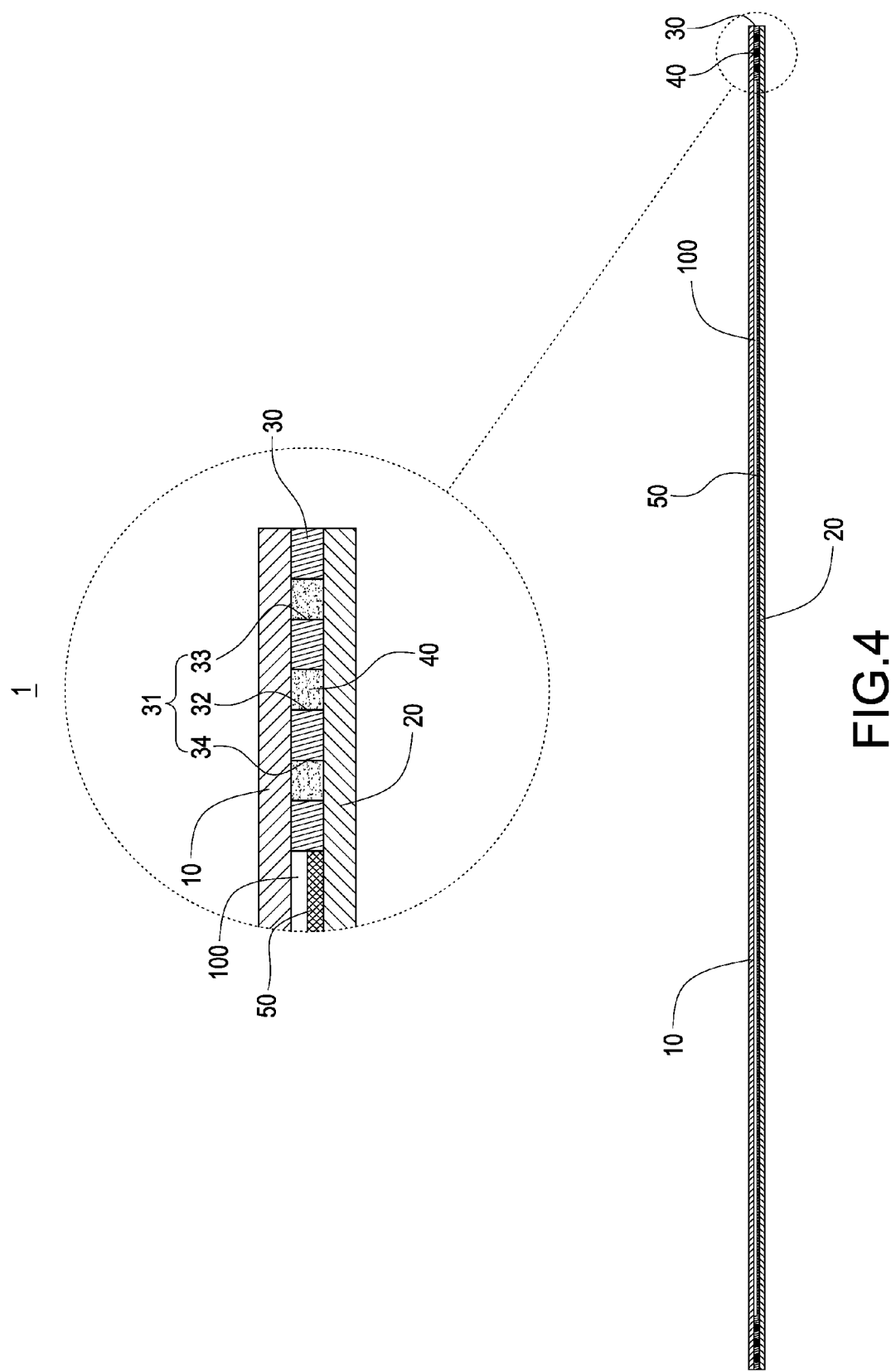
FIG. 4 is a cross-sectional view of the heat plate according to the present invention.

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Please refer to FIGS. 1 to 4, respectively showing a flow chart of a heat plate sealing method, an exploded view of a heat plate, an appearance view of the heat plate, a cross-sectional view of the heat plate according to the present invention. The heat plate sealing method of the present invention comprises: a) providing a bottom plate 10 and a cover plate 20 engaging with each other; b) providing a welding frame 30 including a plurality of welding beads 31, the welding beads 31 surrounding a circumferential edge of the welding frame 30 and including an inner track welding bead 32 and an outer track welding bead 33 disposed outside the inner track welding bead 32; c) disposing the welding frame 30 between the bottom plate 10 and the cover plate 20; d) placing solder 40 on the welding beads 31; e) sandwiching the welding frame 30 having the solder 40 thereon between the bottom plate 10 and the cover plate 20; and f) conducting thermal melting on the solder 40 to seal the bottom plate 10 and the cover plate 20.

The step a) of the present embodiment further comprises disposing a capillary tissue 50 on the bottom plate 10 or the cover plate 20. Further, the welding frame 30 is disposed between circumferential edges of the bottom plate 10 and the cover plate 20. Moreover, in the step b), the inner track welding bead 32 includes a plurality of inner side welding beads 321 spaced out, the outer track welding bead 33 includes a plurality of outer side welding beads 331 spaced out, and the inner side welding beads 321 are disposed staggeredly with respect to the outer side welding beads 331. Moreover, in the step d), the solder 40 overspreads the welding beads 31 (including the inner track welding bead 32 and the outer track welding bead 33). The structure of the heat plate 1 is detailed as follows.

The heat plate 1 includes a bottom plate 10, a cover plate 20, a welding frame 30, solder 40, and a capillary tissue 50. The cover plate 20 is disposed to correspondingly engage with the bottom plate 10. The welding frame 30 is disposed between the bottom plate 10 and cover plate 20. The welding frame 30 has a plurality of welding beads 31, and the welding beads 31 surround the circumferential edge of the welding frame 30. Preferably, the welding beads 31 are a hollow portion respectively.

Further, the welding beads 31 include an inner track welding bead 32 and an outer track welding bead 33 disposed outside the inner track welding bead 32. The inner track welding bead 32 includes a plurality of inner track welding beads 321 spaced out. The outer track welding bead 33 includes a plurality of outer side welding beads 331 spaced out. The inner side welding beads 321 are disposed staggeredly with respect to and partially overlapping the outer side welding beads 331. In the present embodiment, the inner side welding beads 321 and the outer side welding beads 331 overlap with their two ends.

In one embodiment of the present invention, the welding beads 31 further comprise a second inner track welding bead 34 disposed at an inner side of the inner track welding bead 32. The second inner track welding bead 34 and the outer track welding bead 33 are correspondingly disposed at two sides of the inner track welding bead 32. The second inner track welding bead 34 can enhance airtightness and reduce the possibility of leakage of a liquid caused by inferior welding quality.

Moreover, the welding frame 30 and the pieces of solder 40 seal the circumferential edges of the bottom plate 10 and the cover plate 20, and an inner space 100 is formed between the bottom plate 10 and the cover plate 20. The capillary tissue 50 is disposed inside the inner space 100. Further, the pieces of solder 40 overspread and fill the welding beads 30, wherein the bottom plate 10 and the cover plate 20 are sealed together by using the welding frame 30 and conducting thermal melting on the pieces of solder 40.

According to one embodiment of the present invention, the welding frame 30 is a hollow frame, and the welding frame 30 is corresponding in size to the circumferential edges of the bottom plate 10 and the cover plate 20. It should be noted that the welding frame 30 and the pieces of solder 40 provide not only a sealing function but also a supporting function to maintain the inner space 100. Besides, since the bottom plate 10 and the cover plate 20 are a thin metal plate respectively, strength of a circumferential edge (a sealed structure) of the heat plate 1 is enhanced by disposing the welding frame 30.

Figure 5:
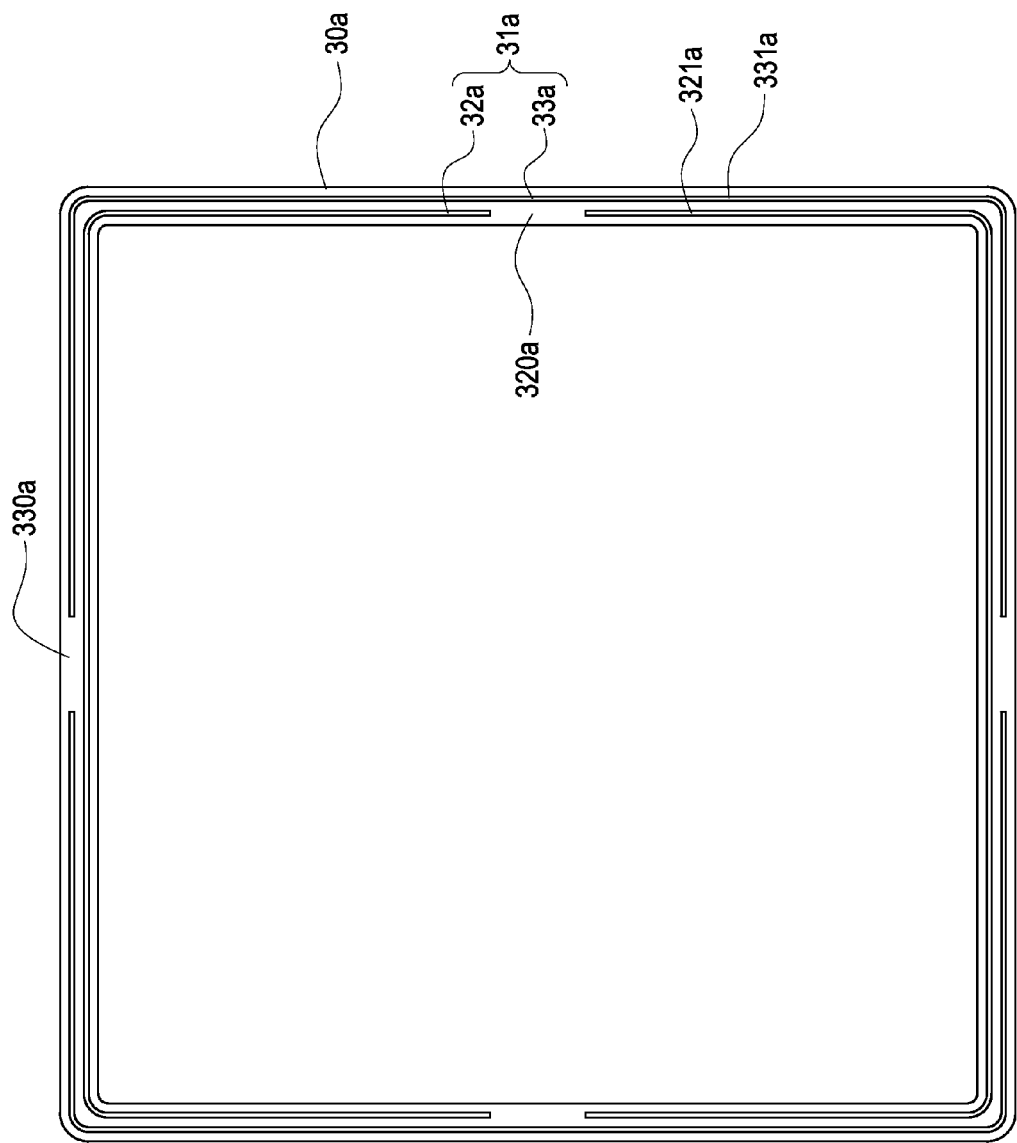
FIG. 5 is a schematic view illustrating a welding frame of the heat plate according to another embodiment of the present invention.

Please refer to FIG. 5 showing a welding frame of a heat plate according to another embodiment of the present invention. As shown in FIG. 5, the welding frame 30a includes a plurality of welding beads 31a. The welding beads 31a surround a circumferential edge of the welding frame 30a. Preferably, the welding beads 31a are a hollow portion respectively. In the present embodiment, the welding beads 31a include an inner track welding bead 32a and an outer track welding bead 33a outside the inner track welding bead 32a. The inner track welding bead 32 includes two inner side welding beads 321a spaced out, and there is an inner gap 320a between the two inner side welding beads 321a spaced out. The outer track welding bead 33a includes two outer side welding beads 331a, and there is an outer gap 330a between the two outer side welding beads 331a. Preferably, the inner gap 320a and the outer gap 330a are staggeredly disposed. The outer track welding bead 33a and the inner track welding bead 32a are disposed in the aforesaid manner to achieve layered welding, thereby ensuring airtightness after sealing.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A heat plate, comprising:
   a bottom plate;
   a cover plate, disposed to correspondingly engage with the bottom plate;
   a welding frame, disposed between the bottom plate and the cover plate and including a plurality of hollow portions, the hollow portions surrounding a circumferential edge of the welding frame, the hollow portions including an inner track and an outer track disposed outside the inner track;
   a plurality of pieces of solder being placed all over and filling the hollow portions; and
   a capillary tissue disposing between the bottom plate and the cover plate, wherein the bottom plate and the cover plate are sealed together by conducting thermal melting on the welding frame and the pieces of solder.

2. The heat plate according to claim 1, wherein the welding frame and the pieces of solder seal the circumferential edges of the bottom plate and the cover plate, an inner space is formed between the bottom plate and the cover plate, and the capillary tissue is disposed inside the inner space.

3. The heat plate according to claim 1, wherein the welding frame is a hollow frame, and the welding frame is corresponding in size to circumferential edges of the bottom plate and the cover plate.

4. The heat plate according to claim 1, wherein the inner track includes a plurality of inner side portions spaced out, the outer track includes a plurality of outer side portions spaced out, the inner side portions are disposed staggeredly with respect to the outer side portions.

5. The heat plate according to claim 4, wherein the inner side portions and the outer side portions overlap with their two ends.

6. The heat plate according to claim 1, wherein the hollow portions further comprise a second inner track disposed at an inner side of the inner track, the second inner track and the outer track are correspondingly disposed at two sides of the inner track.

* * * * *